(12) United States Patent
Homer

(10) Patent No.: US 7,500,004 B1
(45) Date of Patent: Mar. 3, 2009

(54) SYSTEM FOR TRACKING FILES TRANSMITTED OVER THE INTERNET

(76) Inventor: Gregg Homer, 3329 Coy Dr., Sherman Oaks, CA (US) 91423

( * ) Notice: Subject to any disclaimer, the term of this patent is extended or adjusted under 35 U.S.C. 154(b) by 0 days.

(21) Appl. No.: 09/474,317

(22) Filed: Dec. 29, 1999

(51) Int. Cl.
G06F 15/16 (2006.01)

(52) U.S. Cl. .................. 709/228; 709/223; 709/229; 707/6

(58) Field of Classification Search ............ 709/238, 709/221, 223, 224, 228, 229; 380/200; 705/51, 705/57; 707/6
See application file for complete search history.

(56) References Cited

U.S. PATENT DOCUMENTS

| | | | |
|---|---|---|---|
| 5,444,779 A | 8/1995 | Daniele | 379/3 |
| 5,530,520 A | 6/1996 | Clearwater | 355/201 |
| 5,682,227 A | 10/1997 | Taguchi et al. | 355/25 |
| 5,761,686 A | 6/1998 | Bloomberg | 707/529 |
| 5,765,152 A | 6/1998 | Erickson | 707/9 |
| 5,771,355 A * | 6/1998 | Kuzma | 709/242 |
| 5,825,892 A | 10/1998 | Braudaway et al. | 380/51 |
| 5,850,481 A | 12/1998 | Rhoads | 382/232 |
| 5,862,260 A | 1/1999 | Rhoads | 382/232 |
| 5,875,249 A | 2/1999 | Mintzer et al. | 380/54 |
| 5,889,868 A | 3/1999 | Moskowitz et al. | 380/51 |
| 5,901,224 A | 5/1999 | Hecht | 380/4 |
| 5,905,800 A | 5/1999 | Moskowitz et al. | 380/28 |
| 5,915,027 A | 6/1999 | Cox et al. | 380/54 |
| 5,916,305 A * | 6/1999 | Sikdar et al. | 709/236 |
| 5,930,369 A | 7/1999 | Cox et al. | 380/54 |
| 6,055,236 A * | 4/2000 | Nessett et al. | 370/389 |
| 6,101,531 A * | 8/2000 | Eggleston et al. | 709/206 |
| 6,178,442 B1 * | 1/2001 | Yamazaki | 709/206 |
| 6,205,432 B1 * | 3/2001 | Gabbard et al. | 705/14 |
| 6,230,186 B1 * | 5/2001 | Yaker | 709/206 |
| 6,253,326 B1 * | 6/2001 | Lincke et al. | 713/201 |
| 6,301,245 B1 * | 10/2001 | Luzesk et al. | 370/352 |
| 6,385,596 B1 * | 5/2002 | Wiser et al. | 705/51 |
| 6,438,585 B2 * | 8/2002 | Mousseau et al. | 709/206 |
| 6,453,345 B2 * | 9/2002 | Trcka et al. | 709/224 |

(Continued)

OTHER PUBLICATIONS

N. Borenstein, RFC 1521, Network Working Group, Sep. 1993.*

(Continued)

Primary Examiner—Larry D Donaghue
Assistant Examiner—Adnan M Mirza
(74) Attorney, Agent, or Firm—Aka Chan LLP

(57) ABSTRACT

A method for tracking digital files transmitted over the Internet by placing certain identifying indicia within a file, and monitoring selected sites through which Internet traffic is transmitted, to determine the source and destination of a transmission containing a file with particular identifying indicia. Identifying indicia ('ID') is placed in the header of each digital file whose transmission over the Internet is to be monitored. A data communications monitoring device is installed at a Internet service provider's (ISP's) facility. The monitoring device intercepts packets received by the ISP. These intercepted packets are then examined to determine whether they contain an ID of interest. If a sought ID is found within the packet, the source and destination fields in the Internet Protocol (IP) header are logged, along with the ID and other information, in a database. The pertinent contents of the database are then periodically sent to the proprietors whose IDs were discovered in packets in transit across the Internet. A proprietor may then take appropriate steps to secure compensation for the unauthorized copies, or to prevent further dissemination thereof.

30 Claims, 6 Drawing Sheets

U.S. PATENT DOCUMENTS 6,564,253 B1 5/2003 Stebbings ................... 709/217
6,704,873 B1* 3/2004 Underwood ................. 726/12

OTHER PUBLICATIONS

R. Troost, RFC 2183, Network Working Group, Aug. 1997.*
Communications of the ACM, Jul. 1998/vol. 41, No. 7.
Communications of the ACM, Nov. 1997/vol. 40, No. 11.
"Look, It's Not There," BYTE Magazine, Jan. 1997, pp. 1-5.
Page relating to watermark patents and other related links, The DICE Company.
Products, Signafy, Inc., 1999, pp. 1-4.
Website: http://www.robertgraham.com/pubs/sniffing-faw.html Sniffing (network wiretap, sniffer) FAQ, Robert Graham, Sep. 28, 1999, pp. 1-36.

* cited by examiner

SYSTEM FOR TRACKING FILES TRANSMITTED OVER THE INTERNET

BACKGROUND OF THE INVENTION

1. Technical Field

The present invention relates generally to the transmission of data over the Internet, and more particularly, to a method for tracking the Internet distribution of files containing certain identifying indicia.

2. Statement of the Problem

There are presently a number problems related to the sale and distribution of digital media over the Internet. Distribution of text, audio, movies on the Internet is straightforward and available to anyone having a personal computer and a telephone line. Moreover, such distribution results in little or no degradation of the quality of the recipient's copy. This ease of distribution makes it difficult to detect the unauthorized distribution (via Internet transmission) of digital media.

U.S. Pat. No. 5,862,260, to Rhoads, discloses a method of 'surveying' dissemination of proprietary data on the Internet. Rhoads' method identifies files containing 'steganographically' encoded indicia which are located on Internet web sites. Rhoads, however, does not disclose how to track or monitor the Internet transmission of files of interest. Files which are transmitted over the Internet account for a significant amount of unauthorized use of media. Rhoads' method locates only files which are posted on web sites, rather than files in transit over the Internet.

In addition, in order to search for steganographically encoded indicia, which, by definition, is hidden within a file, data contained within the file must be read and decoded to determine the presence or absence of the indicia. Furthermore, since files are also often encoded (e.g., compressed), as is typically the case for transmitted digital audio and video, every encoded file of potential interest must first be decoded before searching for a steganographically encoded indicia of interest, which is embedded in the encoded file.

Therefore, a method is needed for facilitating the monitoring of digital files of interest which are transmitted over the Internet.

3. Solution to the Problem

The present invention overcomes the aforementioned problems of the prior art and achieves an advance in the field by providing a system for tracking digital files transmitted over the Internet by placing certain identifying indicia within a file, and monitoring selected sites through which Internet traffic is transmitted, to determine the source (sender) and destination (recipient) of a transmission containing a file with particular identifying indicia.

More specifically, in accordance with one embodiment of the present method, identifying indicia ('ID') is placed in the header of each file (e.g., a sound recording) whose transmission over the Internet is to be monitored. A data communications monitoring device, such as a 'sniffer', is installed at a Internet service provider's (ISP's) facility. The monitoring device intercepts packets (constituting Internet transmissions) received by the ISP. These intercepted packets are then examined to determine whether they contain an ID of interest. If a sought ID is found within the packet, the source and destination fields in the Internet Protocol (IP) header are logged, along with the ID (and other information, such as date and time), in a database. The pertinent contents of the database are then periodically sent to the proprietors whose IDs were discovered in packets in transit across the Internet. A proprietor may then take appropriate steps to secure compensation for the unauthorized copies, or to prevent further dissemination thereof.

While it is not feasible to monitor all Internet transmissions, and thus not feasible to detect the dissemination of every file containing proprietary information, the method of the present invention provides a deterrent effect to unauthorized distribution of proprietary digital data by making it known that Internet transmissions are systematically monitored for the presence of identifying information in various proprietors' files.

The method of the present invention is also applicable to tracing the transmission of confidential documents and mapping the retransmission patterns of promotional materials for market research.

DETAILED DESCRIPTION

Figure 1:
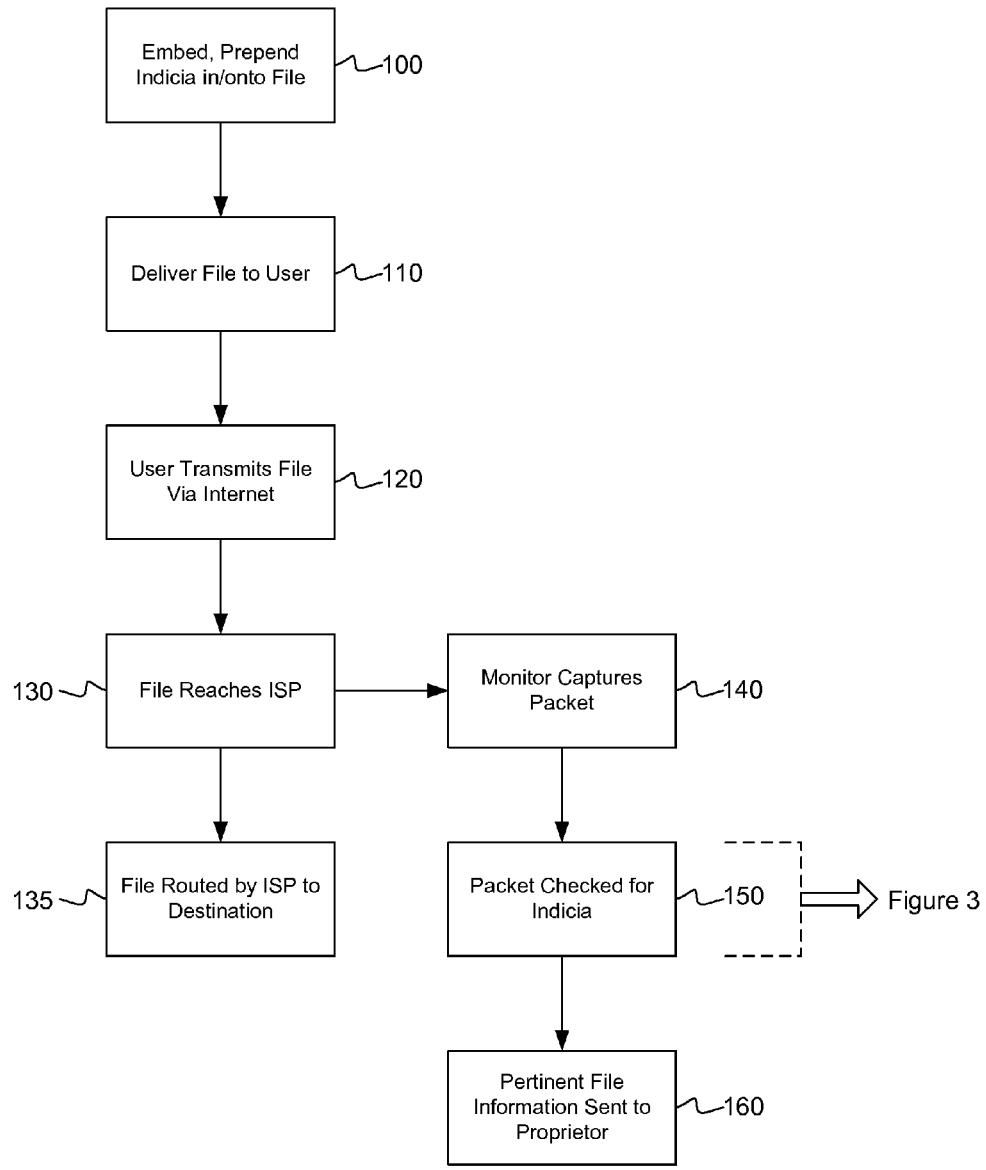
FIG. 1 is a flowchart illustrating, at a high level, steps which may be performed in practicing one embodiment of the method of the present invention.

FIG. 1 is a flowchart illustrating, at a high level, steps which are performed in practicing an exemplary embodiment of the method of the present invention. As shown in FIG. 1, at step 100, a pre-defined sequence of binary digits, hereinafter referred to as 'identifying indicia', is physically associated with a digital file (i.e., a file containing binary information) by placing the identifying indicia in proximity to the file of interest. In accordance with the present invention, 'identifying indicia' may be any of the following user-defined binary sequences:

(a) the file name of the digital file;

(b) an extension to an existing file format;

(c) a pre-defined sequence of characters or bits; or (d) the absence of code (e.g., spaces or zeros) in a pre-defined area within the digital file.

In case (c), above, the pre-defined sequence of characters or bits may take the form of a header which is prepended onto, postpended onto, or embedded within, the digital file of interest. The header is preferably a permanent part of the file, such as in the case of an MPEG Layer 3 (colloquially termed 'MP3') file header, for example.

Many types of digital files are amenable to the present method, including audio files 'ripped' (re-formatted into an MP3 serial bit stream) from Digital Audio Disks, digital video files including movies, and books in the form of digital text files. Furthermore, a given identifying indicia may be located on the physical media itself, such as a Digital Audio Disk, a Digital Video Disk, or a CD ROM. In the case of physical media, the identifying indicia is preferably embedded within a pre-existing header which is defined for that specific media type.

The identifying indicia may be physically associated with the digital file of interest by the entity which manufactures the media, in the case of Digital Audio/Video Disks, or by the distributor of the digital data, in the case of digital files which are not permanently embodied in a physical medium. Alternatively, files which are not recorded on physical media may have identifying indicia attached thereto, or embedded therein, by a third party on-line company which engages in data (file) transfer with the producer of the digital file via the Internet. It is to be noted that that 'identifying indicia' may also already be present in certain file formats, e.g., the bar code identifying field in digital audio disks. Hence, the step of placing identifying indicia in a header of the digital file may not be always required.

At step 110, the digital file of interest, which now contains identifying indicia, is either physically delivered or transmitted (e.g., via the Internet) to a customer, who is the intended 'end user' of the file. The specific mechanism by which this step is performed is not of critical import to the present method.

Figure 2:
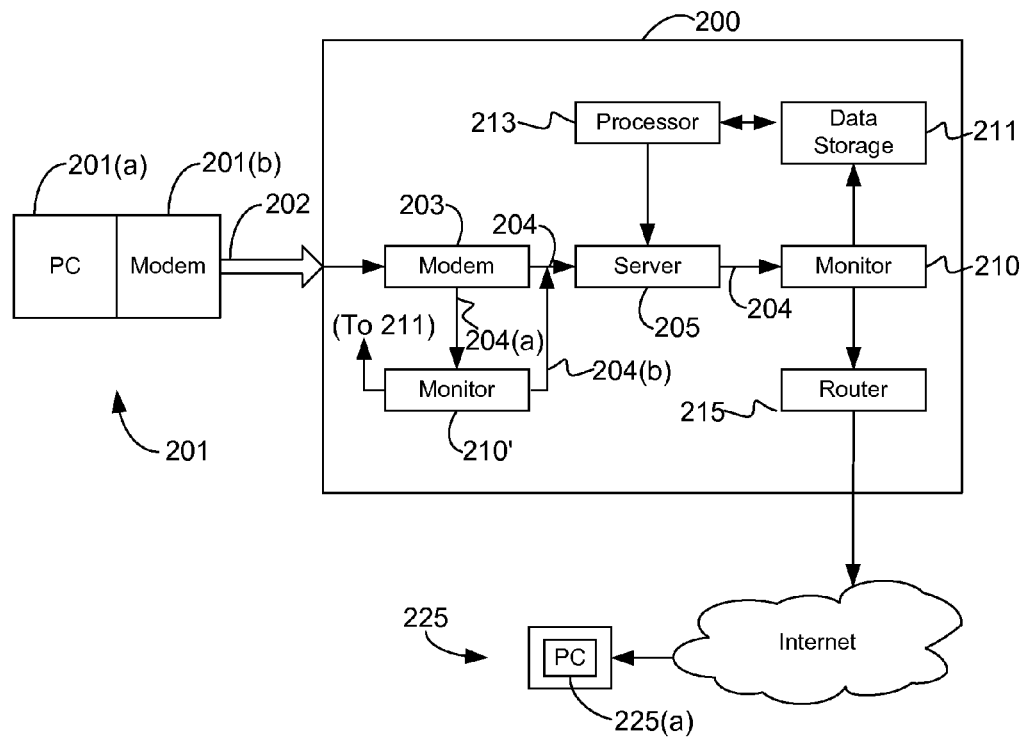
FIG. 2 is a diagram showing an interconfiguration of hardware components utilized in an Internet transmission.

FIG. 2 is a diagram showing an exemplary configuration of hardware components utilized in an Internet transmission. The present method is best understood by viewing FIGS. 1 and 2 in conjunction with one another. At step 120, the file containing the identifying indicia (i.e., the 'file of interest') is transmitted from end user site 201 (shown in FIG. 2) to Internet Service Provider (ISP) site 200.

Two common scenarios exist for the transfer of the file of interest between a user site and ISP site 200. In the first scenario, the user site (not shown) has a plurality of personal computers connected to a local host computer via a local area network (LAN). The host computer may communicate with the ISP site 200 via Point-to-Point Protocol (PPP) or Serial Line Internet Protocol (SLIP), which provide data link layer protocol services in a leased-line or dial-up environment.

In the second scenario, shown in FIG. 2, user site 201 also typically communicates with ISP site 200 via PPP or SLIP protocol. In this scenario, the Internet Protocol (IP) packet header (described in detail below) is set up with appropriate Internet source and destination addresses by the operating system (e.g., Windows 9x) in user's personal computer PC 201(a). The destination Internet address information is typically provided to PC 201(a) by a name server which is either in communication with, or located at, ISP site 200.

At step 130, the file of interest reaches an Internet Service Provider (ISP) or other monitoring entity which employs the method of the present invention. As shown in FIG. 2, end user PC 201(a) is connected to ISP site 200 via modem 201(b) and communication channel 202, which, for example, is a dial-up telephone line. ISP site 200 typically includes a plurality of modems which communicate with users of the ISP's services, although only a single modem 203 is shown in FIG. 2, for the purpose of clarity.

ISP site 200 includes a server 205, which typically provides services such as email hosting, Usenet newsgroups, and user web site hosting. The presence of these services is not necessary, however, to practice the method of the present invention. In accordance with the present method, server 205 is connected to a monitoring device 210, which is a programmable digital processor capable of capturing every packet that it receives, and of decoding all layers of the OSI protocol model (described below). Monitoring device ('monitor') 210 may be a network protocol analyzer, often referred to as a 'sniffer', or monitor 210 may be a general-purpose computer, such as a PC, which is programmed to inspect packets received from server 205 in accordance with the present method. Monitor 210 is connected to server 205 via a 'local cable' 204, such as an Ethernet wire.

In accordance with the present method, monitor 210 is programmed to capture and inspect all traffic (i.e., every packet) received from server 205, unlike a normal Ethernet device, which is programmed to ignore all traffic not having the Ethernet MAC (Media Access Control) address specific to the device. A network protocol analyzer which is programmed to capture every packet received is said to be in 'promiscuous mode'. Alternatively, monitor 210 may be programmed to capture some predetermined percentage of the packets received from server 205, if inspection of every received packet would significantly slow the traffic between server 205 and router 215. In any event, at step 135, all of the packets received from server 205 are forwarded by monitor 210 to router 215, which sends them to the next appropriate Internet leg in the packets' transmission path through the Internet 220.

The method of the present invention utilizes information in the Internet (Network) layer of the protocol stack, specifically, the Internet Protocol header (described below), to determine the addresses of the sender and the recipient of files containing certain identifying indicia. The present method functions in the context of various Internetworking environments. Several of these environments are described in the following sections to illustrate how and where the present method locates the desired addresses of the sender and recipient for a given file.

The Protocol Stack

In order to send data from computer (PC) 201(a) at user site 201 to computer 225(a) at a destination site 225, an application program running on PC 201(a) must generate a request for access to network (i.e., Internet) resources. The application program generating this request is said to reside at the top of what is called a protocol stack. When a request is prepared for transmission over the network, each protocol in the stack applies its own control data through a process known as data encapsulation. Data encapsulation is the process by which each protocol in the stack takes the data handed down to it from the layer above and packages it by applying a header. A header consists of additional information used to implement the particular features of that protocol.

Figure 3:
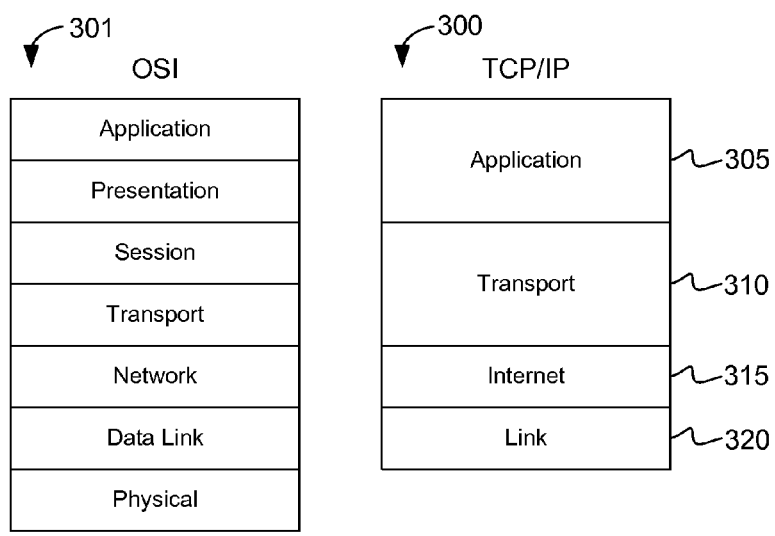
FIG. 3 is a diagram mapping the OSI Reference Model to the protocol stack used in a TCP/IP communications environment.

When the request is passed down to the application-layer protocol, a header, containing the control data needed by the same protocol at the receiving system, is affixed to the request. Once the header is applied, the original request becomes the payload, the baggage carried by the protocol. The protocol at application layer of the stack produces a structure, consisting of a header and a payload, which it passes down to the next layer. The application layer payload contains any data to be transmitted by the application program. FIG. 3, which is discussed in detail below, shows the protocol stacks for the OSI Reference Model and the TCP/IP model.

The structure produced by the application-layer protocol is then passed down to the transport layer, where a second protocol (Transmission Control Protocol, in the examples in this document) applies its own header. Together the application-layer header and payload become the payload of the transport-layer protocol. The transport-layer protocol cares nothing about the contents of the application protocol header or the original request. This process continues at each successive lower layer of the protocol stack, until a structure called a packet is created. The packet consists of four or more headers attached to the original message. Each header contains control data, solely intended for a specific protocol on the receiving system. The bottom of the protocol stack is the interface to the network medium, itself, e.g., a cable or phone line.

During its journey downwards through the stack, the application program request is transformed from a system services call, such as a email utility program Send_Mail command, into a coded signal, suitable for network transmission, which includes the data comprising the message. As the received packet is passed up through the layers of the stack at the destination computer 225(a), each header is read, in turn, by the appropriate protocol, until the decoded signal reaches an application at the top. The receiving application, for example, the email utility program on PC 225(a), processes the request by storing the accompanying data as an email message in an appropriate location, such as an 'In-box' in PC 225.

TCP/IP (Transmission Control Protocol/Internet Protocol) is one of several protocol suites that operating systems can use to process application requests for transmission over a network. Some operating systems, like UNIX, are completely dependent on TCP/IP, while others like Windows NT provide an open networking architecture that can utilize various different stacks. The TCP/IP protocol suite represents the context in which the present invention is explained, as TCP/IP presently provides the network services most commonly used for email and other communication over the Internet. It should be noted that the method of the present invention is also operative with the User Datagram Protocol (UDP), which may be used in lieu of TCP in environments where an end-to-end datagram (connectionless) service is adequate for certain types of transmissions.

The OSI Reference Model and the TCP/IP Protocol

At a very high level, the process of generating a request, transmitting it over a network, and receiving a response is divided into layers to make it more manageable and comprehensible. The TCP/IP protocols are also divided into layers representing some of the same processes (and using some of the same names) as their counterparts in the OSI model. FIG. 3 is a diagram mapping the OSI (Open Systems Interconnection) Reference Model 301 to the protocol stack 300 used in a TCP/IP communications environment. The OSI Reference Model 301 divides the functionality of the networking process into a seven-layer structure. In a TCP/IP communications environment, such as that described (in greater detail below) in the present document, there are effectively only four layers of network functionality that correspond to the OSI reference model. The four layers of the TCP/IP stack 300 are shown in FIG. 3. The basic functions of the TCP/IP layers are enumerated below:

Application layer 305—As shown in FIG. 3, the application layer 305 in the TCP/IP stack 300 maps roughly to the application and presentation layers of the OSI model 301. Some TCP/IP application layer protocols are full-fledged user applications which generate network-service requests, such as Simple Mail Transport Protocol (SMTP, discussed below) and FTP. Other protocols provide support to applications in the form of services, such as the Domain Name System (DNS). In either case, the data transmitted in association with the application layer resides above the application layer 305, and is not considered to be an actual part of the application layer itself.

Transport layer 310—As in the OSI model, the transport layer 310 provides end-to-end communications services in the form of two protocols: the Transmission Control Protocol (TCP) and the User Datagram Protocol (UDP). The TCP/IP transport layer 310 maps essentially to both the OSI Session and Transport layers because the OSI does not define any specific use for the session layer.

Internet layer 315—The Internet layer contains IP (the Internet Protocol), which is responsible for the packaging, addressing, and routing of data to its destination. Also operating at this layer are the Internet Control Message Protocol (ICMP) and the Internet Group Management Protocol (IGMP). This layer is also referred to as the Network layer. The Internet Protocol is described in greater detail below.

Link layer 320—The link layer contains protocols used to facilitate the transmission of IP data over the existing network medium. The TCP/IP standards do not define the functionality of the OSI data link and physical layers. Instead, the standards define protocols like the Address Resolution Protocol (ARP) that provide an interface between TCP/IP structures and the physical network.

Two of the underlying interface protocols are particularly relevant to TCP/IP. The Serial Line Internet Protocol (SLIP, RFC 1055) and Point-to-Point Protocol (PPP, RFC 1661), respectively, may be used to provide data link layer protocol services where no other underlying data link protocol may be in use, such as in leased line or dial-up environments. 'RFC' document numbers are references to documents published by the IETF (Internet Extensions Task Force). Most commercial TCP/IP software packages for PC-class systems include these two protocols. With SLIP or PPP, a remote computer can attach directly to a host server and, therefore, connect to the Internet using IP rather than being limited to an asynchronous connection. PPP, in addition, provides support for simultaneous multiple protocols over a single connection, security mechanisms, and dynamic bandwidth allocation.

The names of the four layers that comprise the TCP/IP protocol stack used here are those defined in RFC 1122, "Requirements for Internet Hosts-Communication Layers." Many sources use alternative names, for instance, referring to the internet layer as the network layer. The link layer is also referred to as the network interface layer.

The TCP/IP protocols do not provide all of the functionality found in the seven layers of the OSI model, nor can they be exactly equated to OSI equivalents. The two networking models can be roughly compared as shown in FIG. 3, in which the TCP/IP application layer is approximately equivalent to the application and presentation layers of the OSI model. The internet and transport layers of both stacks provide approximately the same functions, but the TCP/IP stack's link layer is a special case.

The protocols controlling access to the network, and the actual signaling used on the medium, are found in the link and physical layers of the OSI model. On a typical LAN (local area network), these are generally Ethernet or Token Ring, which are the common names for the IEEE (Institute of Electrical and Electronics Engineers) 802.3 and 802.5 standards, respectively. The TCP/IP standards do not define data link and physical protocols of this type. Instead, the TCP/IP protocols are designed to work with networking technologies like Ethernet and Token Ring, as well as many other lower-layer protocols used on Internet systems. The method of the present invention is operative in various Internetworking environments including those which employ Ethernet, Token Ring, and other link-layer protocols used on Internet systems, including Point-to-Point Protocol (PPP). The operation of the present method in the context of Ethernet and PPP protocols is described in the following section, but it is to be noted that the present method is operative in networking environments in addition to those presented in the following examples.

Link Layer Protocols

Ethernet Protocol

Figure 4A:
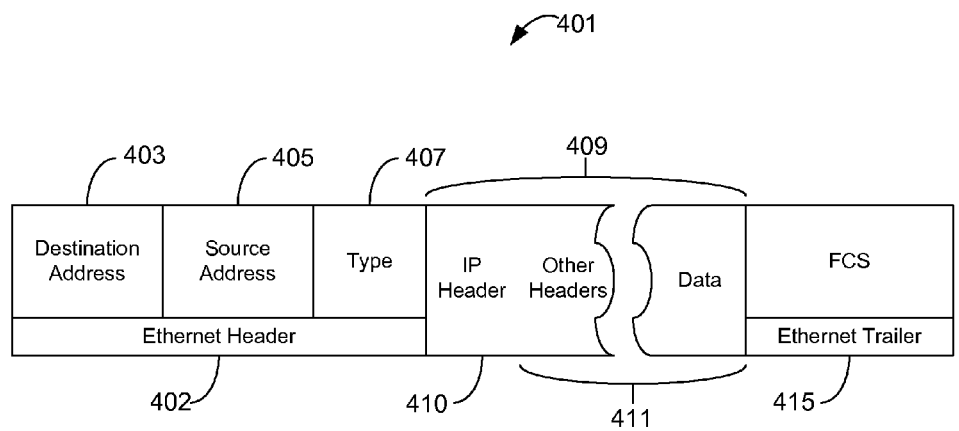
FIG. 4a is a diagram of an Ethernet frame.

FIG. 4a is a diagram of an Ethernet Version II frame 401, showing an Ethernet header 402 and an Ethernet trailer 415 encapsulating an information field (payload) 409 including an IP header 410 and other (optional) headers and data 411. Several versions of the Ethernet protocol exist, but all versions operate similarly to encapsulate data for transmission over a LAN. Ethernet header 402 comprises local network Destination and Source MAC address fields 403/405, each of which is 6 bytes in length; and Type field 407 (2 bytes), which specifies the memory buffer into which the frame 401 is to be placed. The IP header 410 and other headers and data 411 follow the Ethernet header 402. Ethernet trailer 415 comprises a 4 byte Frame Check Sequence (FCS), or checksum.

An Ethernet protocol is frequently employed to provide local area networking in an ISP site 200. In an exemplary embodiment of the present invention, monitor 210 is connected to server 205 via an Ethernet link 204, which in a typical ISP site, interconnects a plurality of servers and routers. In the present exemplary embodiment, only a single server 205 and a single router 215 are shown, for the sake of simplicity.

At step 140, in an exemplary embodiment of the present method, monitor 210 detects and captures the first packet of an Internet transmission. In this embodiment, it is assumed that line 204 is an Ethernet link. In addition, in this embodiment modem 203 and monitor 210' may not be present, if communications line 202 is connected to a router, either within, or external to ISP site 200. In such a case, line 202 is directly connected to server 205, connecting directly to line 204. Unlike a normal Ethernet device, which is programmed to ignore all traffic not having the Ethernet MAC address specific to the device, monitor 210 is programmed to read every packet that it receives, or a predetermined percentage thereof. In the present example, monitor 210 copies information field 409 to local memory (not shown) for analysis, as described below. Optionally, the contents of field 409 may be stored in data storage device 211 for subsequent analysis, either by monitor 210 or by processor 213. Analysis of the contents of the data in field 411 is performed in step 150, described in detail below with reference to FIG. 5.

Point-to-Point Protocol

Figure 4B:
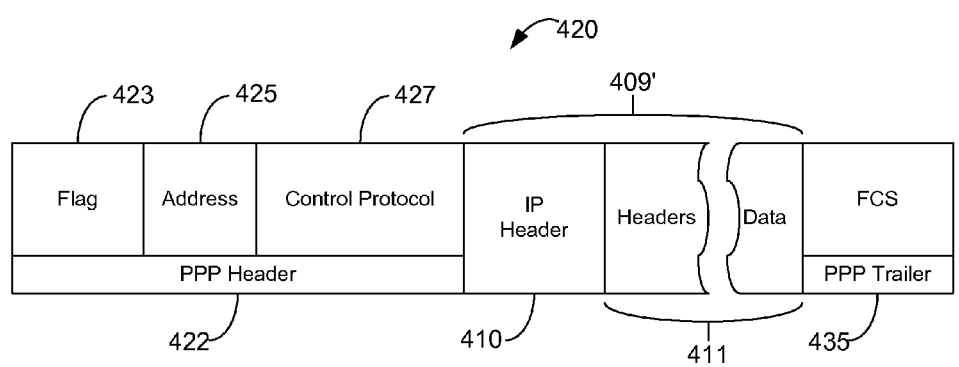
FIG. 4b is a diagram of a PPP frame.

The Point-to-Point Protocol (PPP) is designed for serial links which transport packets between two peers, such as PC 201(*a*) and server 205: PPP is typically employed over dial-up lines, e.g., line 202. FIG. 4*b* is a diagram of a PPP frame 420, showing a PPP header 422 and a PPP trailer 435 encapsulating information field (payload) 409 including an IP header 410 and other headers and data 411. PPP header 422 comprises a one byte flag field 423, a single byte address field 425 containing all ones (the standard broadcast address), a one byte control field 427 indicating that the frame is unsequenced, and a two byte protocol field 429, which identifies the protocol encapsulated in the information field 409. PPP trailer 435 comprises a 4 byte Frame Check Sequence (FCS).

PPP is structured on High-Level Data Link Control Protocol (HDLC), which defines the boundaries around the individual PPP frames 420, and provides a 16 bit checksum, stored in FCS field 435. A PPP frame 420 is capable of handling packets from protocols including IP, Novell IPX, and Appletalk. PPP achieves this by adding a protocol field 429 to the basic HDLC frame 420 that identifies the type of packet carried by the frame.

Each network protocol that is routed across the data link (for instance, IP) is configured dynamically using a corresponding Network Control Protocol (NCP). For example, to send IP datagrams across the link, both PPP modules must first negotiate which IP-address each of them uses. The control protocol used for this is IPCP, the Internet Protocol Control Protocol. Note that the PPP frame 420 does not include the MAC addresses contained in Ethernet frames 401, so the dial-up link 202 must be established and configured prior to sending any Internet-layer datagrams.

PPP is implemented by means of a special line discipline. To use a serial line as a PPP link, the connection is first established, in an exemplary embodiment of the present method, between PC 201(*a*) at user site 201 and server 205 at ISP site 200 via modems 201(*b*) and 203, and the line is then converted to PPP mode. In this mode, all incoming data is passed to the PPP driver, which checks the FCS (field 435) checksum in incoming HDLC frames for validity, and unwraps and dispatches them.

At step 140, in an alternative exemplary embodiment of the present method, monitor 210' detects and captures the first packet of an Internet transmission. In this alternative embodiment, it is assumed that some of the incoming messages received over line 202 are PPP transmissions. Furthermore, in this embodiment, Monitor 210' is connected between modem 203 and server 205 via lines 204(*a*) and 204(*b*), in place of line 204. Monitor 210' is programmed to read every packet that it receives, or a predetermined percentage thereof. In the present embodiment, if monitor 210' detects that then it copies information field 409 to local memory (not shown) for analysis. Optionally, the contents of field 409 may be stored in data storage device 211 for subsequent analysis, either by monitor 210' or by processor 213. In the present alternative embodiment, monitor 210 is optional, and if excluded, server 205 is directly connected to router 215.

Packet Processing

Figure 5:
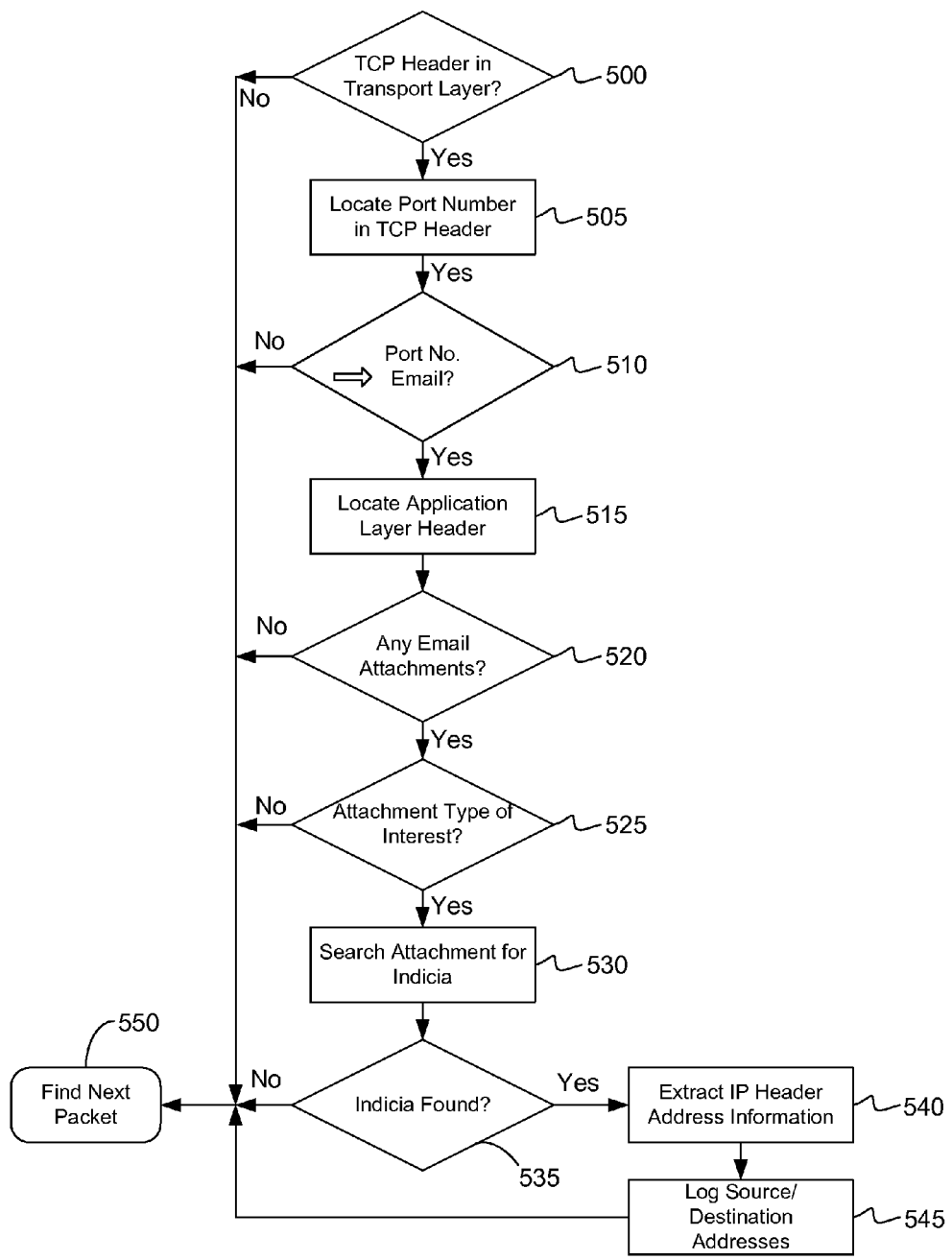
FIG. 5 is a flowchart describing the process of inspecting an Internet packet for identifying indicia.

At step 150, the contents of information field 409, which have been stored in either local memory of monitor 210/210' or data storage device 211, are examined in accordance with the procedure set forth in FIG. 5. (Note that the reference number 210 is used hereinafter to interchangeably represent either monitor 210 or monitor 210'.) FIG. 5 is a flowchart describing the process of inspecting the contents 409 of an Internet packet for identifying indicia which has been placed in, or in proximity to, a file of interest (as defined above). The present method assumes that a large percentage of digital files comprising audio and video recordings, and the like, are transmitted over the Internet as attachments to electronic mail (email). Therefore, the present method seeks to determine, first of all, whether the file associated with the contents of a given captured field 409 is an email message, and then, if so, whether the email message has an attachment which contains the particular identifying indicia being sought.

Figure 7A:
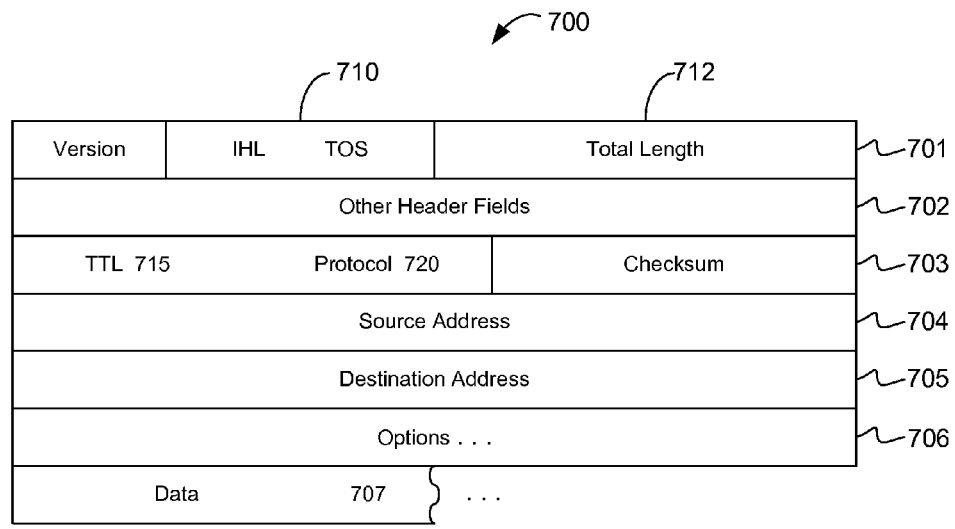
FIG. 7a is a diagram of an IP frame.

In accordance with step 150 in FIG. 1, at step 500 in FIG. 5, the captured packet is inspected by monitor 210, or alternatively, by processor 213, to determine whether the TCP protocol is used in the next higher layer, namely, the transport layer. This determination is made by inspecting the Protocol field in the IP header, which is shown in FIG. 7*a*, described below. The value of the Protocol field is '6' if the higher layer protocol contents of the data carried in the packet is the TCP protocol. If TCP protocol is being used for the packet being inspected, then, at step 505, the port number in the TCP header is located.

Transmission Control Protocol

The Transmission Control Protocol (TCP), described in RFC 793, provides a virtual circuit (connection-oriented) communication service across a network. TCP includes rules for formatting messages, establishing and terminating virtual circuits, sequencing, flow control, and error correction. Most of the applications in the TCP/IP suite operate over the reliable transport service provided by TCP.

Figure 6:
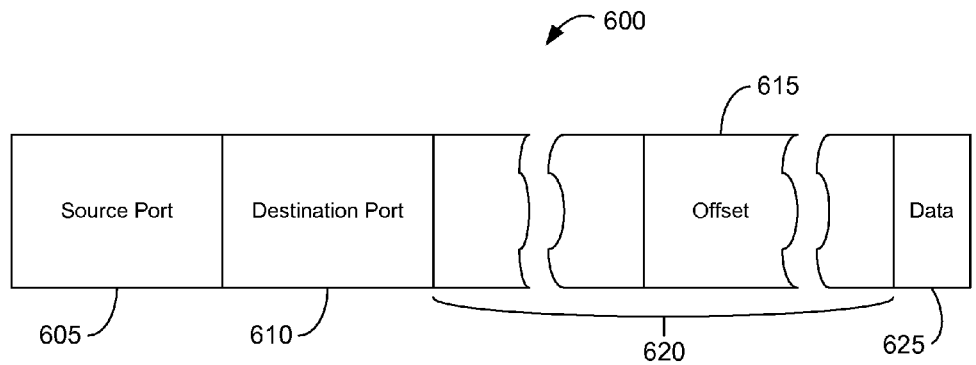
FIG. 6 is a diagram of a TCP segment.

FIG. 6 is a diagram of a TCP segment 600. The TCP data unit 600 is called a segment due to the fact that TCP does not recognize messages, per se, but merely sends a block of bytes from the byte stream between sender and receiver. The fields of the segment include Source Port field 605 and Destination Port field 610 which identify the source and destination ports, which in turn identify the end-to-end connection and the corresponding higher-layer application. The remainder of the TCP header 620 includes Offset field 615 which indicates the number of bytes in the header prior to the data field 625 of the segment 600.

The TCP/IP protocol suite includes two protocols in the transport layer 310 of the TCP/IP stack 300 that correspond roughly to the OSI Transport and Session Layers; these protocols are called the Transmission Control Protocol (TCP) and the User Datagram Protocol (UDP). The UDP protocol is not of interest in performing the present method, since it is not amenable to error-free transmission of files containing multiple packets of data. Higher-layer applications are referred to by a port identifier in TCP/UDP messages. The port identifier and IP address (in the Internet layer) together form a socket, and the end-to-end communication between two hosts is uniquely identified on the Internet by the four-tuple (source port, source address, destination port, destination address). The well-known port numbers that denote the server side of a connection include port number 25 for SMTP (Simple Mail Transport Protocol) and port number 110 for POPv3 (Post Office Protocol, version 3). These two protocols, SMTP and POPv3, are two protocols of interest to the present method, because they indicate that the presently captured packet, and possibly its following companion packets, include an email message.

Therefore, at step 510 (in FIG. 5), the determination is made as to whether the present packet is part of an email transmission, or 'message', by checking the Destination Port field 610. If the Destination Port field 610 contains the value 25 or 110, then an email message has been located, and the present process continues by searching for an attachment to the email message which might contain a file of interest, i.e., a file containing a particular identifying indicia.

At step 515, the first header for the application layer 305 is located by using the value in the Offset field 615. The application layer header is found at the beginning of Data field 625 in the TCP segment 600. Next, at step 520, a determination is made as to whether the present email transmission contains any attachments. In order to determine the presence (or absence) of an attachment, the header fields in the application layer 305 must be inspected. This inspection procedure requires a knowledge of the types of headers which may be prepended to an email message. These headers are typically defined by the SMTP and MIME standards and are described in the following section.

Electronic Mail Protocols

SMTP (Simple Mail Transfer Protocol) is an Internet standard for transporting email defined by RFC 821. SMTP is, however, limited to 7-bit ASCII text with a maximum line length of 1000 characters which results in a number of limitations, including the constraint that SMTP cannot transmit 'raw' binary files or images.

SMTP defines headers which are of the format:

Header Name : Header Text

Examples of SMTP Header Names include 'To', 'From', 'Subject', and 'X-Field', where Field is a user-defined field. These headers are not of interest to the present method.

MIME (Multipurpose Internet Mail Extensions) builds on the SMTP standard by defining additional fields for mail message headers that describe new types of content and organization for messages. MIME allows mail messages to contain Images, Audio, Video and multi-media messages. MIME is defined by the Internet standard document RFC 1521. MIME defines the following header fields not recognized by SMTP:

(a) The MIME-Version header field, which uses a version number to declare that a message conforms to the MIME standard;

(b) the Content-Type header field, which can be used to specify the type and subtype of data in the body of a message and to fully specify the encoding of such data;

(c) the Content-Transfer-Encoding header field, that specifies how the data is encoded to allow it to pass through mail transports having data or character set limitations; and (d) two header fields that can be used to further identify and describe the data in a message body, the Content-ID and Content-Description header fields.

The MIME-Version Header Field

To allow mail reading programs to recognize MIME messages, MIME messages are required to contain a MIME-Version header field. Messages that comply with the standard must include a header field, with the following text:

MIME-Version: 1.0

The MIME-Version header field is required at the top level of the MIME section of a message. Step 520 includes searching the application layer headers of an email message for the presence of the MIME-Version Header Field. In an exemplary embodiment of the present method, if this header is not found, then the present packet is discarded, and monitor 210 then waits for the initial packet of the next transmission, at step 550. It is to be noted that files of interest may be attached to email messages by mechanisms other than MIME; thus, in an alternative embodiment, the present method examines the application layer header for additional information which would indicate that an attachment exists in the present transmission.

If a MIME-Version header is found, then the present method proceeds to step 525, where a determination is made as to whether the present transmission contains an attachment which is possibly of interest.

The Content-Type Header Field

The Content-Type header field is used to specify the nature of data in the body or body part of the email message, by giving type and subtype identifiers, and by providing parameters that may be needed for certain types. The syntax for the content-type header field is:

Content-Type := type "/" subtype [";" parameter]

After the type and subtype names, the remainder of the header field is a set of parameters, specified in an attribute=value notation. The set of meaningful parameters differs for different types. The top-level Content-Type is used to declare the general type of data, while the subtype specifies a specific format for that type of data.

The MIME standard defines seven content-types, four of which are of potential interest to the present method. These four content types are:

(1) Audio, which indicates audio data. Audio/Basic indicates that the content of the Audio/Basic subtype is audio encoded using 8-bit ISDN u-law. When this subtype is present, a sample rate of 8000 Hz and a single channel is assumed.

(2) Image, which indicates image data. Image/Jpeg indicates an image in JPEG format.

(3) Video, which indicates that the body contains a time-varying-picture image, possibly with color and coordinated sound. Video/Mpeg indicates video coded according to the MPEG standard.

(4) Application, which indicates data that does not fit into any of the other categories, such as uninterpreted binary data or information to be processed by an email-based application. Application/Octet-Stream indicates uninterpreted binary data, which a mail reading program may simply offer to write the information into a file.

The Content-Transfer-Encoding Header Field

Many Content-Types that could usefully be transported by email are represented, in their "natural" format, as 8-bit character or binary data. Such data cannot be transmitted over some transport protocols. As indicated above, SMTP restricts mail messages to 7-bit ASCII data with lines no longer than 1000 characters.

MIME thus provides several mechanisms for re-encoding such data into a 7-bit short-line format. The Content-Transfer-Encoding header field indicates the mechanism used to perform such an encoding. Possible values for the Content-Transfer-Encoding field include BASE64 and x-Encoding-Name, where 'EncodingName' is an encoding technique which may be defined according to some proprietary standard, and thus may be of interest. Furthermore, the Content-Transfer-Encoding header field may also provide additional information to allow determination of how to decode the attachment if the identifying indicia being sought is embedded in the file itself, rather than being prepended to the file as a header.

MIME also allows multiple types of messages in a single 'message'. Therefore, an exemplary embodiment the present method inspects all of the MIME headers in order to avoid overlooking the existence of an attachment potential interest. The term "multipart" appears in a 'Content-Type' header if multiple messages (attachments) are present. Each of the attachments is delineated by a boundary which is defined following the "boundary=" subfield. An example of a multipart MIME message is presented below:

MIME-Version: 1.0
From: End User
Subject: A Multi-part MIME example
Content-Type: multipart/parallel; boundary=unique-boundary-1
--unique-boundary-1--
Content-Type: image/gif
Content-Transfer-Encoding: Base64
. . . base64-encoded image data goes here . . .
--unique-boundary-1--
Content-Type: audio/x-mpeg
Content-Transfer-Encoding: base64
. . . base64-encoded MPEG audio data goes here . . .
--unique-boundary-1--

MIME headers of potential interest, i.e., headers which would indicate the presence of an attached audio or video file of interest, are Content-Type header fields having content types of 'audio', 'image', 'video', and possibly 'application'. If any of these headers are detected at step 525, it is assumed that the present message contains a file of potential interest. In the above example, the "Content-Type: audio/x-mpeg" header is a 'flag' which indicates that an attachment is present in the file that may be of interest. In such a case, the present method proceeds to step 530.

Storing and Locating Identifying Indicia

At Step 530, in accordance with an exemplary embodiment of the present method, the present packet is searched for the presence of identifying indicia of interest. The following example is provided in the exemplary context of an MPEG Layer 3 (MP3) v2 audio file, although it should be noted that the present method is amenable to other types of files including video, text, and other specific types of audio files.

Figure 8:
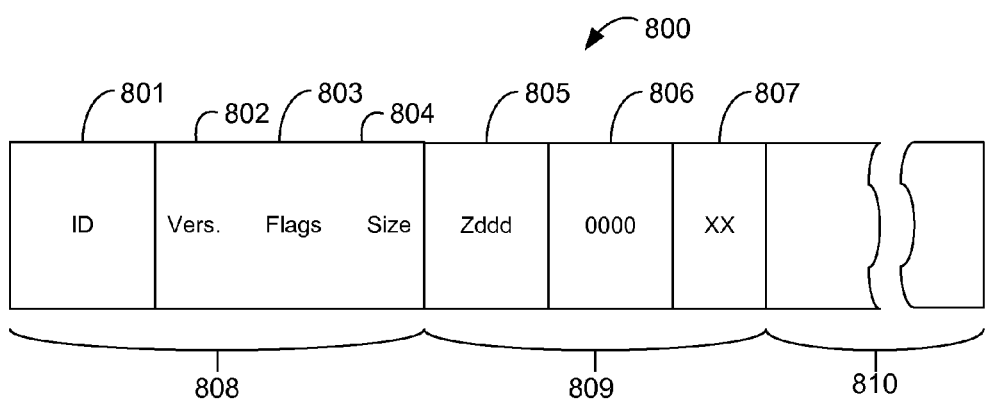
FIG. 8 is a diagram of a digital audio file containing an ID3v2 identification header in accordance with the present invention.

FIG. 8 a diagram of a digital audio file 800 containing an ID3v2 identifying tag (header) 808, and a frame 809 formatted in accordance with the present invention. The ID3v2 tag may be prepended to binary audio data files, including MPEG-1/2 layers I-III, and MPEG-2.5 files, to provide supplementary information about the file. The ID3v2 tag does not interfere with playback of the attached file, as it does not contain an embedded sync signal, and is therefore ignored by MPEG decoding software.

The first four fields 801-804 shown in FIG. 8 constitute the ID3v2 tag header 808 as defined by the ID3 tag version 2.3.0 standard (published Feb. 3, 1999). These four fields 801-804 and their values/sizes are as follows:

| | | |
|---|---|---|
| 801 | File identifier | "ID3" (3 bytes) |
| 802 | Version | "03 00" (hex) |
| 803 | Flags | 1 byte |
| 804 | Size | 4 bytes |

The next three fields 805-807 constitute an ID3v2 frame 809 formatted in accordance with the method of the present invention. The ID3v2 format stipulates that the tag header 808 may be followed by any number of frames. According to the ID3v2 standard, each of the frames consists of a frame header followed by one or more information fields. Only a single, 'special' frame 809 is shown in FIG. 8, but an MPEG file (e.g., MPEG layer III, informally termed 'MP3') may contain additional frames which are not specifically shown. This 'special' frame 809 does not have an appended information field and therefore is, in essence, a 'header' for the appended data, and constitutes 'identifying indicia' for the appended data file in accordance with an exemplary embodiment of the present method.

The ID3v3 specification defines a frame header 809 as a 4 byte frame ID 805, a 4 byte frame size field 806, and a 2 byte flag field 807, respectively, formatted in accordance with the present exemplary embodiment as follows. The frame size, specified by field 806, is zero bytes (indicated by the value "0000"), indicating that there is no information field appended to frame header 809. ID field 805 has the value "Zddd", where "Z" is the ASCII character "Z", and "ddd" is an alphanumeric identification number, representing, for example, the owner or proprietor of the appended digital file. ID fields (805) beginning with "X", "Y", or "Z" are user-defined fields, and provide one of many possible areas into which identifying indicia may be placed.

In further accordance with the present method, field 807 is a 2 byte number which can be used to further identify the proprietor of the appended file and/or to provide other identifying information. Therefore, five bytes are available for providing an identifying indicia in an ID3v2 file tagged in accordance with the present embodiment. Alternatively, frame size field 806 may specify the size of an appended information field which may provide up to 256 megabytes of additional identifying indicia. Finally, field 810 includes any additional ID3v2 frames and appended data, which in this example, is an MPEG Layer 3-formatted audio file. There is no fixed order of appearance of ID3v2 frames in a tag, therefore a search of all tags for a given file may be necessary to locate a particular identifying indicia.

At step 535, if identifying indicia of interest 809 is located in the packet being presently examined, then the present method proceeds to step 540, otherwise, monitor 210 then waits for the initial packet of the next transmission, at step 550.

After finding an identifying indicia of interest, the address of the sender and the recipient of the file of interest is determined at step 540. In order to determine the address of the sender and of the recipient of the file, the method of the present invention must be able to decipher the IP header. The following section provides format information which is used for determining the addresses of the sender and/or the recipient of a file of interest.

The Internet Protocol

The Internet Protocol (RFC 791), provides services that are roughly equivalent to the OSI Internet Layer. IP provides a datagram (connectionless) transport service across the network. This service is sometimes considered to be unreliable because the network does not guarantee delivery nor notify the end host system about packets lost due to errors or network congestion. Since IP does not provide a mechanism for flow control, the TCP protocol, described above, is typically employed to provide flow control in conjunction with IP networking services.

IP Packet (Datagram) Header Format

The basic format the header (701-706) for an IP packet 700 is shown in FIG. 7*a*. The fields contained in the IP header that are of potential interest to the present method, and their functions, are as follows.

(a) The Internet Header Length (IHL) field 710 indicates the length of the datagram header in 32 bit (4 octet) words. A minimum-length header is 20 octets, so this field 710 always has a value of at least 5 (0101).

(b) The Total Length field 712 Indicates the length (in bytes, or octets) of the entire packet 700, including both header and data. Given the size of this field 712, the maximum size of an IP packet 700 is 64 KB, or 65,535 bytes. In practice, packet sizes are limited to the maximum transmission unit (MTU). If this field 712 indicates that the packet size is less than the maximum size of 64 KB, then the transmission may not contain a file of interest, if, for example, the file is an audio or video file.

(c) The Protocol field 720 indicates the higher layer protocol contents of the data carried in the packet; options include TCP (6), and UDP (17).

(d) The Source Address field 704 indicates the IP address of the host sending the packet.

(e) The Destination Address field 705 indicates the IP address of the host intended to receive the packet.

IP addresses are 32 bits in length. They are typically written as a sequence of four numbers, representing the decimal value of each of the address bytes. Since the values are separated by periods, the notation is referred to as dotted decimal. A sample IP address is 208.162.106.17 (the format of which is explained below).

IP Address Format

Figure 7B:
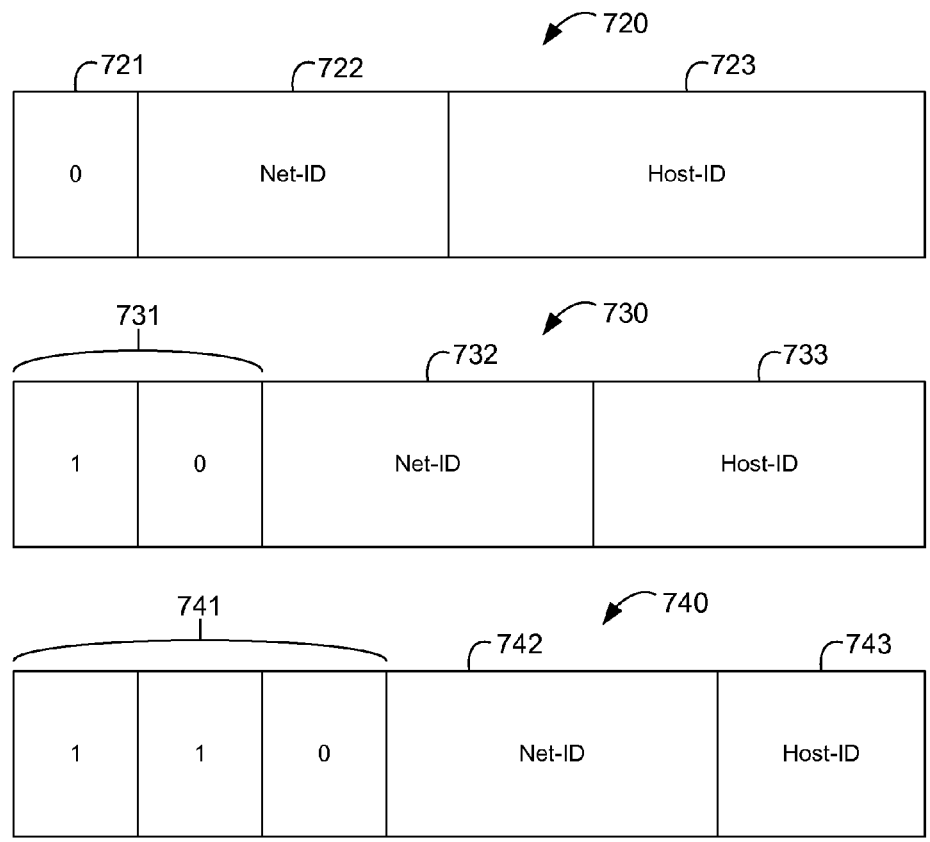
FIG. 7b is a diagram of the address sub-fields of class A through C address fields in an IP datagram.

IP addresses are hierarchical for routing purposes and are subdivided into two subfields. FIG. 7*b* is a diagram of the address sub-fields 720, 730, 740, of class A through C address fields, respectively, in an IP datagram. As shown in FIG. 7*b*, the Network Identifier (NET-ID) subfield (722, 732, 742) identifies the TCP/IP subnetwork connected to the Internet. The NET-ID is used for high-level routing between networks, much the same way as the country code, city code, or area code is used in the telephone network. The Host Identifier (HOST-ID) subfield (723, 733, 743) indicates the specific host within a subnetwork.

To accommodate different size networks, IP defines five address classes. Classes A, B, and C are used for host addressing; the classes differ in the length of the NET-ID subfield. Examples of the address classes are given below.

A Class A address (720) has a 7-bit NET-ID and 24-bit HOST-ID. Class A addresses are intended for very large networks and can address up to 16,777,216 (224) hosts per network. The first digit (721) of a Class A address will be a number between 1 and 126. Relatively few Class A addresses have been assigned; examples include 9.0.0.0 (IBM) and 35.0.0.0 (Merit).

A Class B address (730) has a 14-bit NET_ID and 16-bit HOST_ID. Class B addresses are intended for moderate sized networks and can address up to 65,536 (216) hosts per network. The first digit (731) of a Class B address will be a number between 128 and 191. A Class B address assignment example is 152.163.0.0 (America Online).

A Class C address (740) has a 21-bit NET_ID and 8-bit HOST_ID. These addresses are intended for small networks and can address only up to 254 (28-2) hosts per network. The first digit (741) of a Class C address will be a number between 192 and 223. Most addresses assigned to networks today are Class C; an examples is 208.162.102.0 (Hill Associates).

The remaining two address classes are used for special functions only and are not commonly assigned to individual hosts:

Class D addresses begin with a value between 224 and 239, and are used for IP multicasting (i.e., sending a single datagram to multiple hosts).

Class E addresses begin with a value between 240 and 255, and are reserved for experimental use. It is therefore likely that only class A-C addresses will contain files of interest to the present method.

Using the addressing scheme described above, at step 540, source address field 704 and, optionally, destination address field 705, are located and the specific source/destination computers are identified for the file of interest. It is to be noted that the source and destination Internet addresses may also be found in headers directly associated with the email message itself, in addition to being located in the IP header.

At step 545, the source and/or destination fields are logged (recorded) in a file or database in data storage device 211. Finally, At step 160, the pertinent contents of the database are periodically transmitted to the proprietors (at a site remote from the ISP) whose specific identifying indicia were discovered in the packets transiting through ISP site 200. Proprietors may then take appropriate steps to secure compensation for the unauthorized copies, or to prevent further dissemination thereof.

Although the present invention has been described in considerable detail with reference to certain preferred versions thereof, other versions are possible. Therefore, the scope of the appended claims should not be limited to the description of the preferred versions contained herein. For example, the specific configuration of the ISP site 200, the format and contents of the various headers, as well as the particular search mechanisms described above should not be construed as limited to the specific embodiments described herein.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Also, any element in a claim that does not explicitly state "means" for performing a specified function or "step" for performing a specified function, should not be interpreted as a "means" or "step" clause as specified in 35 U.S.C. § 112.

I claim:

1. A method for tracking the transmission of a digital file over the Internet comprising the steps of:
    receiving packets constituting segments of the file in transit over the Internet;
    examining file headers in the packets to determine the presence of specific identifying indicia therein;
    recording the Internet Protocol header source address for each of the packets containing the specific identifying indicia;
    when the specific identifying indicia is determined to not be present, preventing recording of the Internet Protocol header source address for each of the packets of the file; and
    when the specific identifying indicia is determined to be present, sending the received packets unaltered to a next Internet leg in a transmission path of the file.

2. The method of claim 1, including the additional step of recording the Internet Protocol header destination address for the file.

3. The method of claim 1, including the additional step of transmitting the specific identifying indicia and the source Internet address to a proprietor of the file.

4. The method of claim 1, including the additional step of transmitting the specific identifying indicia and the source Internet address to a remote site.

5. The method of claim 1, wherein the examining step further includes:
    searching the file headers for TCP headers containing port numbers indicative of an email message;
    searching each of the packets, in which port numbers indicative of email messages were found, for an attachment; and
    when the attachment is found, locating the source Internet address in an IP header for the file containing the attachment.

6. The method of claim 1, wherein the specific identifying indicia comprises a user-defined character sequence selected from the group consisting of:
    an extension to an existing file format, prepended to the file;
    a sequence of bits embedded in the file; and
    an absence of code in a predefined area within the file.

7. A system for tracking an Internet transmission of a digital file, the system comprising:
    a server which receives the file;
    a monitor, connected to the server, which processes packets constituting segments of the file;
    wherein the monitor is programmed to:
    examine file headers in the packets to determine the presence of specific identifying indicia therein;
    record the source Internet address for the file for each of the packets containing the specific identifying indicia; and
    when the specific identifying indicia is determined to not be present, prevent recording of the source Internet address for the file for each of the packets; and
    a router, connected to the monitor, which when the specific identifying indicia is determined to be present in the file, routes packets comprising the file unaltered to a next Internet leg in a transmission path of the file.

8. The system of claim 7, wherein the monitor is further programmed to:
    search the file headers for TCP headers containing port numbers indicative of email messages;
    search each of the packets, in which port numbers indicative of email messages were found, for an attachment; and
    locate the source Internet address in an IP header for the file containing the attachment.

9. The system of claim 7, wherein the specific identifying indicia comprises a user-defined character sequence selected from the group consisting of:
    an extension to an existing file format, prepended to the file;
    a sequence of bits embedded in the file; and
    an absence of code in a predefined area within the file.

10. A system for tracking an Internet transmission of a digital file comprising:
    a modem which receives the file;
    a server for processing the file;
    a monitor, connected between the modem and the server, which processes packets constituting segments of the file; wherein the monitor is programmed to:
    examine file headers in the packets to determine the presence of specific identifying indicia therein;
    record the source Internet address for the file for each of the packets containing the specific identifying indicia; and
    when the specific identifying indicia is determined to not be present, prevent recording of the Internet Protocol header source address for each of the packets of the file; and
    when the specific identifying indicia is determined to be present, means for sending the received file unaltered to a next Internet leg in a transmission path of the file.

11. A method for tracking the transmission of a digital file over the Internet comprising the steps of:
    receiving packets constituting segments of the file in transit over the Internet;
    examining file headers in the packets to determine the presence of specific identifying indicia therein;
    recording, for each of the packets containing the specific identifying indicia, the source Internet address for the file;
    when the specific identifying indicia is determined to not be present, preventing recording of the Internet Protocol header source address for each of the packets of the file; and
    when the specific identifying indicia is determined to be present, sending the received packets unaltered to a next Internet leg in a transmission path of the file.

12. The method of claim 11, wherein the examining step further includes:
    searching the file headers for TCP headers containing port numbers indicative of email messages;
    searching each of the packets, in which port numbers indicative of email messages were found, for a MIME header indicative of an attachment; and
    when the MIME header indicative of an attachment is found:
    searching a header directly prepended to the file to find the specific identifying indicia therein, when the MIME header is indicative of an attachment containing a type of the file sought; and
    locating the source Internet address in an IP header for the file containing the attachment, when the specific identifying indicia is found.

13. The method of claim 11, wherein the specific identifying indicia comprises a user-defined character sequence selected from the group consisting of:
    an extension to an existing file format, prepended to the file; a sequence of bits embedded in the file; and
    an absence of code in a predefined area within the file.

14. A method for tracking the transmission of a digital file over the Internet comprising the steps of:
    placing specific identifying indicia in the digital file;
    using a data communications monitoring device to capture packets of information being transmitted via the Internet without alteration of the captured packets;
    examining certain ones of the packets to determine the presence of the specific identifying indicia in the file;
    recording the source and destination Internet addresses for each of the packets containing the specific identifying indicia, and the identity of the file associated therewith;
    when the specific identifying indicia is determined to not be present, prevent recording of the Internet Protocol header source address for each of the packets of the file; and
    when the specific identifying indicia is determined to be present, sending the captured packets unaltered to a next Internet leg in a transmission path of the file.

15. The method of claim 14, wherein the specific identifying indicia is prepended to the header.

16. The method of claim 14, wherein the specific identifying indicia is embedded in the file.

17. A method for tracking the transmission of a digital file over the Internet comprising the steps of:
    receiving packets constituting segments of the file in transit over the Internet; searching the packets for TCP headers containing port numbers indicative of email messages;
    searching each of the packets, in which the port numbers indicative of email messages were found, for a MIME header indicative of an attachment;
    when the MIME header indicative of an attachment is found:
    searching a header directly prepended to the file to locate specific identifying indicia therein, when the MIME header is indicative of an attachment containing a type of the file sought;
    locating a source Internet address in an IP header for the file containing the attachment containing the type of the file sought, when the specific identifying indicia is located; and
    recording, for each of the packets containing the specific identifying indicia, the source Internet address for the file;
    sending the received packets containing the specific identifying indicia unaltered to a next Internet leg in a transmission path of the file; and
    when the specific identifying indicia cannot be located, prevent recording of the source Internet address for the file.

18. The method of claim 17, including the additional step of transferring the specific identifying indicia and the source Internet address to a proprietor of the file.

19. The method of claim 18, including the additional step of transferring additional information in the file to the proprietor of the file.

20. A system for tracking an Internet transmission of a digital file containing specific identifying indicia in a file header, wherein the file comprises a plurality of packets constituting segments of the file, the system comprising:
    a server for receiving the file;
    monitoring means, connected to the server, for examining file headers in the packets to determine the presence of the specific identifying indicia therein;
    means for recording the source Internet address for the file for each of the packets containing the specific identifying indicia;
    when the specific identifying indicia is determined to not be present, means for preventing recording of the source Internet address for the file for each of the packets; and
    a router, connected to the monitoring means, for routing packets comprising the file unaltered to a next Internet leg in a transmission path of the file when the specific identifying indicia is determined to be present.

21. The system of claim 20, wherein the monitoring means further comprises searching means for:
    locating the file headers for TCP headers containing port numbers indicative of email messages;
    locating each of the packets, in which port numbers indicative of email messages were found, for an attachment; and
    locating the source Internet address in an IP header for the file containing the attachment.

22. A method for tracking the transmission of a digital file over the Internet comprising the steps of:
    receiving packets constituting segments of the file in transit over the Internet;
    searching the packets for an MPEG Layer 3 header prepended to the file;
    searching the MPEG Layer 3 header for specific identifying indicia located therein, if the MPEG Layer 3 header is located;
    locating the source Internet address in an IP header for the file containing the specific identifying indicia, if the specific identifying indicia is located;
    recording, for each of the packets containing the specific identifying indicia, the source Internet address for the file;
    when the specific identifying indicia cannot be located, preventing recording of the Internet Protocol header source address for each of the packets of the file; and
    when the specific identifying indicia is located, sending the received packets unaltered to a next Internet leg in a transmission path of the file.

23. The method of claim 22, wherein the specific identifying indicia is located in a header having a field indicating that the frame size thereof is zero bytes in length.

24. The method of claim 22, wherein the specific identifying indicia is located in a header having a frame size field indicating that there is no information field appended to the frame size field.

25. The method of claim 22, wherein the specific identifying indicia comprises a user-defined character sequence located in the "frame ID" and "flags" fields of an ID3v2 frame header.

26. The method of claim 22, wherein the specific identifying indicia comprises a user-defined character sequence selected from the group consisting of:
- an extension to an existing file format, prepended to the file;
- a sequence of bits embedded in the file; and
- an absence of code in a predefined area within the file.

27. A method for tracking the transmission of a digital file over the Internet by a first user to a second user comprising the steps of:
- receiving from the first user packets constituting segments of the file in transit over the Internet;
- examining file headers in the packets to determine the presence of specific identifying indicia therein;
- recording the Internet Protocol header source address for each of the packets containing the specific identifying indicia;
- when the specific identifying indicia is determined to not be present, preventing recording of the Internet Protocol header source address for each of the packets of the file;
- when the specific identifying indicia is determined to be present, sending the received packets unaltered to a next Internet leg in a transmission path of the file to the second user; and
- transmitting the specific identifying indicia and the source Internet address to a third user.

28. The method of claim 1 comprising:
When the specific identifying indicia is determined to not be present, sending the received packets unaltered to the next Internet leg in the transmission path of the file.

29. The method of claim 1 wherein the file is at least one of an audio file, image file, video file, or application file.

30. The method of claim 1 wherein the specific identifying indicia has been embedded into the file by a provider of the file.

* * * * *